United States Patent [19]

Nakamura et al.

[11] Patent Number: 4,999,071
[45] Date of Patent: Mar. 12, 1991

[54] PROCESS FOR MANUFACTURING LAMINATED SAFETY GLASS

[75] Inventors: Eitaro Nakamura, Tokyo; Toyoichi Arai, Himi, both of Japan

[73] Assignee: Nippon Zeon Co., Ltd., Tokyo, Japan

[21] Appl. No.: 361,684

[22] Filed: May 31, 1989

Related U.S. Application Data

[63] Continuation of Ser. No. 124,516, Nov. 24, 1987, abandoned.

[30] Foreign Application Priority Data

Nov. 25, 1986 [JP] Japan .................. 61-280243

[51] Int. Cl.$^5$ .............................. B32B 17/00
[52] U.S. Cl. ...................... 156/99; 156/305; 156/320; 156/322; 156/330; 156/333; 428/415; 524/314; 525/331.5; 526/273; 526/345
[58] Field of Search ................ 156/99, 330, 305, 333, 156/320, 322; 526/273, 345; 525/331.5; 428/415; 524/314

[56] References Cited

U.S. PATENT DOCUMENTS

| | | | |
|---|---|---|---|
| 2,091,615 | 8/1937 | Röhm et al. | 156/99 |
| 2,606,177 | 8/1952 | Downing | 525/331.5 |
| 3,050,507 | 8/1962 | Rees | 525/331.5 |
| 4,382,996 | 5/1983 | Mori et al. | 526/273 |

Primary Examiner—John J. Gallagher
Attorney, Agent, or Firm—Armstrong, Nikaido, Marmelstein, Kubovcik & Murray

[57] ABSTRACT

This invention relates to a process for manufacturing laminated safety glass.

A first process comprises the steps of:
(A) coating at least one side of a glass plate with a film-forming plastisol composed of an epoxy group containing vinyl chloride resin as an indispensable component;
(B) heating said glass plate having a coating to form a gel plastisol layer on at least one side of said glass plate; and
(C) laminating another glass plate thereon through the medium of said gel plastisol layer and heating the resulting laminate, thereby bonding said glass plates to each other.

A second process comprises the steps of:
(a) filling the gap between the surfaces of a plurality of glass plates with a film-forming plastisol composed of an epoxy group-containing vinyl chloride resin as an indispensable component; and
(b) heating said plurality of glass plates containing said film-forming plastisol filled into the gap therebetween, thereby bonding said plurality of glass plates to each other.

15 Claims, 2 Drawing Sheets

PROCESS FOR MANUFACTURING LAMINATED SAFETY GLASS

This application is a continuation of application Ser. No. 124,516, filed Nov. 24, 1987, now abandoned.

BACKGROUND OF THE INVENTION

This invention relates to a process for manufacturing laminated safety glass. More particularly, the present invention is concerned with a process for manufacturing laminated safety glass which comprises laminating and bonding a plurality of glass plates through the medium of a film-forming plastisol composed mainly of an epoxy group-containing vinyl chloride resin.

Heretofore, laminated safety glass has been manufactured by a method which comprises interposing a plastic film called an interlayer, including a plasticized polyvinyl butyral, between a plurality of glass plates to laminate the glass plates and subjecting the resulting laminate to deaeration, application of pressure, and heating. However, in the conventional process, in order to remove sodium bicarbonate which has been applied on the surface of the film for the purpose of preventing the self-adhesion between the plastic films themselves, not only a step of washing the film and a step of regulating the moisture of the film after cutting took much time, but also the laminate of the glass plates should be bonded through two steps, i.e., a step of a preliminary contact bonding in a vacuum bag and a step of heat contact bonding in an autoclave, which raises problems such as low productivity and high production cost.

Further, in order to eliminate the step of washing the plastic film composed of plasticized polyvinyl butyral, it was proposed to store and transport the plastic film in a cooled state. However, this method cannot solve the problem on complexity accompanying the handling in a cooled state.

On the other hand, films made of plasticized vinyl chloride, ethylene-vinyl acetate copolymer resin, and ethylene-acrylic acid copolymer resin have been proposed as films free from occurrence of self-adhesion. However, these films do not lead to the solution of the problem on the necessity of many steps, i.e., cutting of the film, adjusting the size of the film with the glass plates, preliminary contact bonding, and main contact bonding.

SUMMARY OF THE INVENTION

The present invention was made in order to eliminate the drawbacks accompanying the above-mentioned conventional methods.

Specifically, a first object of the present invention is to solve the problem on low productivity of the conventional process which uses an interlayer.

A second object of the present invention is to provide a process for manufacturing laminated safety glass which can reduce the number of the steps required for manufacturing laminated safety glass through the interposition of a liquid substance having a specific composition between a plurality of glass plates, i e., can eliminate the step of contact bonding in an autoclave to enhance the productivity of the laminated safety glass to such an extent that a continuous production by taking advantage of on-line operations can be adopted.

The above-mentioned objects of the present invention can be attained by the two following processes.

The first process comprises coating at least one side of a glass plate with a film-forming plastisol composed of an epoxy group-containing vinyl chloride resin as an indispensable component, heating said glass plate to form a glass plate coated with a film, laminating another glass plate thereon through the medium of the film surface of said glass plate coated with a film, and heating the resulting laminate.

The second process comprises filling the gap between the surfaces of a plurality of glass plates with a film-forming plastisol composed of an epoxy group-containing vinyl chloride resin as an indispensable component and heating the resulting laminate.

DESCRIPTION OF THE PREFERRED EMBODIMENTS

Figure 1:
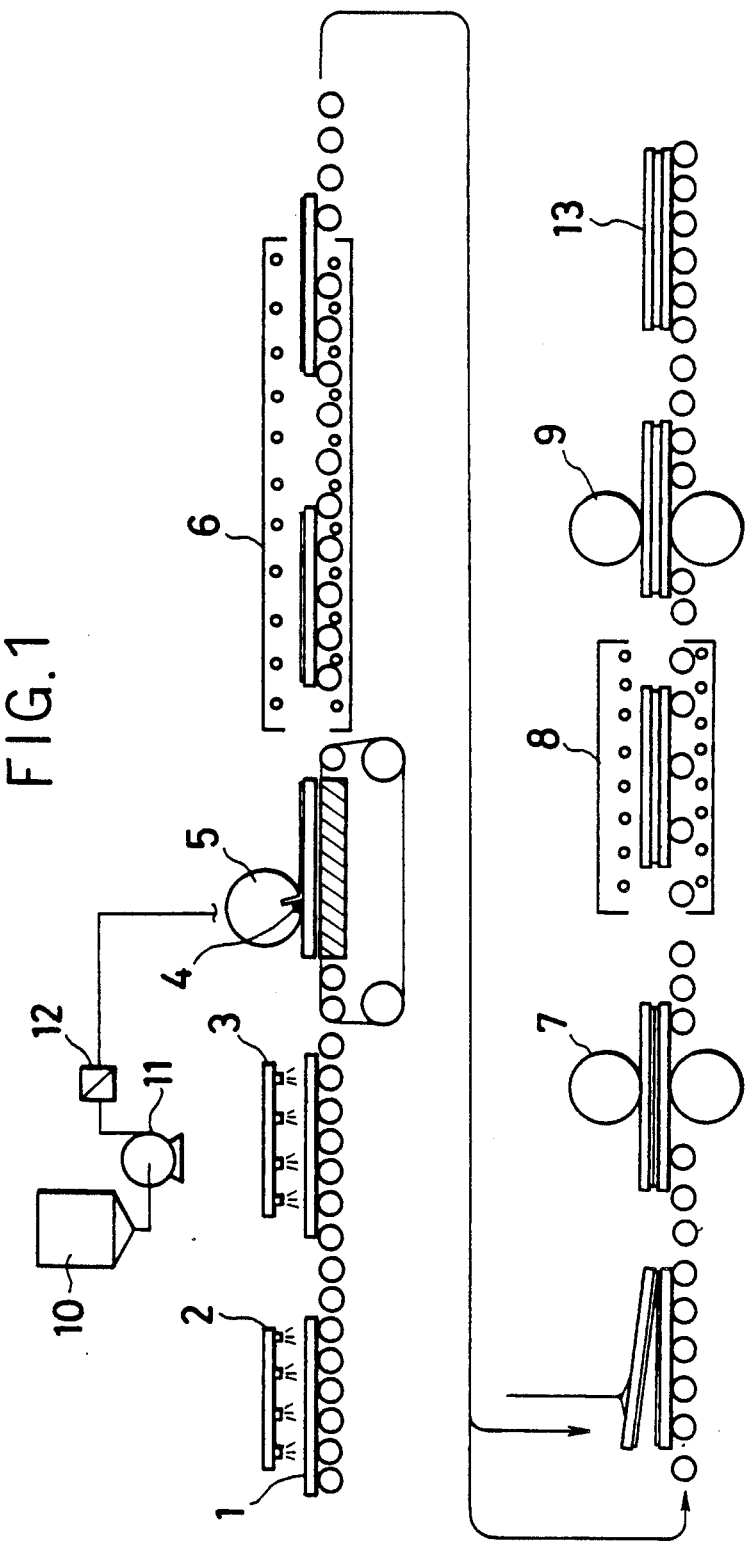
FIG. 1 is a flow diagram showing an example of the process for manufacturing a flat laminated safety glass through the roll press method based on the first process according to the present invention.

The film-forming plastisol used in the present invention comprises an epoxy group-containing vinyl chloride resin as an indispensable component and, if necessary, additives added thereto, such as a plasticizer, a thermal stabilizer, and an ultraviolet absorber.

Typical examples of the epoxy group-containing vinyl chloride resin include (i) a copolymer of vinyl chloride, a monomer having an epoxy group and an optional component composed of a monomer copolymerizable with these components and (ii) a product obtained by adding an epoxy group to a vinyl chloride polymer.

Examples of the monomer having an epoxy group in the above item (i) include glycidyl ether of unsaturated alcohol, such as allyl glycidyl ether and methallyl glycidyl ether; glycidyl esters of saturated acid, such as glycidyl acrylate, glycidyl methacrylate, glycidyl p-vinylbenzoate, methyl glycidyl itaconate, glycidyl ethyl maleate, glycidyl vinylsulfonate, and glycidyl (meth)acrylsulfonate; and epoxide olefins, such as butadiene monoxide, vinylcyclohexene monoxide, and 2-methyl-5,6-epoxyhexene.

Examples of the monomer other than the monomer having an epoxy group and vinyl chloride, i.e., a monomer which is used according to need include vinyl esters of carboxylic acid, such as vinyl acetate and vinyl propionate; vinyl ethers, such as methyl vinyl ether, isobutyl vinyl ether, and cetyl vinyl ether; vinylidenes, such as vinylidene chloride and vinylidene fluoride; unsaturated carboxylates, such as diethyl maleate, butyl benzyl maleate, di(2-hydroxyethyl) maleate, dimethyl itaconate, methyl (meth)acrylate, lauryl (meth)acrylate, and 2-hydroxypropyl (meth)acrylate; unsaturated nitriles such as (meth)acrylonitrile; and aromatic vinyls, such as styrene, α-methylstyrene, and p-methylstyrene. These monomers are selected at will for the purpose of adjusting the gel characteristics and hardness of the epoxy group-containing vinyl chloride resin or the like.

Well known methods, such as suspension polymerization and emulsion polymerization, may be adopted in order to prepare an epoxy group-containing vinyl chloride resin from these starting materials. However, in order to suitably maintain the flowability of the plastisol, it is preferred that the emulsion polymerization or microsuspension polymerization which is appreciated as the method of preparing a vinyl chloride resin for paste processing be used.

Examples of the vinyl chloride polymer in the above item (ii) include a vinyl chloride homopolymer obtained by emulsion polymerization or microsuspension polymerization which is a common resin for use in paste processing, and a copolymer of vinyl chloride with other monomer of the kind mentioned in the above item (i) as an optional component.

An epoxy group is added to a vinyl chloride polymer by a method which comprises subjecting a vinyl chloride copolymer to dehydrochlorination through heat treatment thereof or contact thereof with an alkali compound and then epoxidizing the polymer with an organic per acid or the like.

The content of the epoxy group in the epoxy group-containing vinyl chloride resin is 0.5 to 20% by weight. When the content is less than 0.5% by weight, the adhesion to glass is unsatisfactory.

The degree of polymerization of the epoxy group-containing vinyl chloride resin is preferably 600 to 3,000. When the degree of polymerization is less than 600, the penetration resistance of the laminated safety glass is unfavorably lowered when the proportion of the epoxy group-containing vinyl chloride resin in the interlayer is large. On the other hand, when the degree of polymerization exceeds 3,000, a remarkably large amount of heat is required for the gelation of the plastisol, which not only leads to a lowering in productivity but also causes coloring or requires the use of a large amount of a stabilizer which in turn brings about an increase in the production cost.

A wide variety of plasticizers generally called plasticizers for polyvinyl chloride can be used as the plasticizer for constituting the plastisol. Examples of the fatty acid plasticizer include dioctyl adipate, butyl diglycol adipate, dioctyl azelate, dibutyl sebacate, and diisodecyl adipate. Examples of phthalic acid plasticizer include dioctyl phthalate, dibutyl phthalate, diisobutyl phthalate, butyl benzyl phthalate, dilauryl phthalate, and diheptyl phthalate. Examples of phosphoric acid plasticizers include trixylenyl phosphate tricresyl phosphate, cresyl diphenyl phosphate, trischloroethyl phosphate, trischloroethyl phosphite, and tributyl phosphate. Examples of epoxy derivative plasticizers include an epoxidized soybean oil and monoester of an epoxy fatty acid. If necessary, polyester plasticizers may also be used. It is preferred that the content of the plasticizer in the plastisol be 20 to 80 parts by weight based on 100 parts by weight of the epoxy group-containing vinyl chloride resin. When the amount of the plasticizer is too large, the film strength after heat gelation is lowered On the other hand, when the amount is too small, not only the hardness is excessively increased, but also the flowability of the plastisol cannot be secured.

It is preferred that the plastisol contain a thermal stabilizer and an ultraviolet absorber.

Examples of a preferable thermal stabilizer include alkylated tin compounds of fatty acid, such as butyltin laurate and butyltin maleate, and alkyltin-containing sulfur compounds, such as bis(isooctylthioglycolate) salt of di-n-octyltin. It is also possible to use these thermal stabilizers in combination with a metallic soap-base stabilizer.

A benzotriazole ultraviolet absorber exhibits excellent performance as the ultraviolet absorber. Examples of a preferable benzotriazole ultraviolet absorber include 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, and 2-(2'-hydroxy-4'-octoxyphenyl)benzotriazole.

Further, if necessary, an antioxidant, a lubricant, a filler, a colorant, etc. may be added to the plastisol. A phenolic antioxidant is a preferable antioxidant, and examples thereof include 2,6-di-tert-butyl-p-cresol, 2,2'-methylenebis(4-methyl-6-tertbutylphenol), 4,4'-butylidenebis(3-methyl-6-tertbutylphenol), and 4,4'-thiobis(3-methyl-6-tertbutylphenol).

Further, in the present invention, if necessary, resins compatible with the vinyl chloride resin, such as vinyl chloride resin for paste processing which is free from epoxy group, acrylic resin, and epoxy resin, crosslinking agents, thickeners and diluents and, further, silane or titanate coupling agents etc. may be mixed in the plastisol.

The plastisol is prepared by a customary method, i.e., by mixing the resin, plasticizer, etc. with the above-mentioned materials and then deaerating the resulting mixture. Since the plastisol is liquid, not only dust and foreign materials contained therein can be readily removed by means of a filter, but also the storage and transportation can be conducted in a closed system, such as tank and pipeline, which makes it easy to control the quality and, at the same time, makes it easy to automate the process.

According to the present invention, laminated safety glass is manufactured using the above-prepared plastisol by the following first or second process.

First Process:

In the first invention, the surface of glass which has been, if necessary, preliminary washed prior to use is directly coated with the plastisol thus prepared by means of a coater, such as blade coater, roll coater, screen coater, flow coater, or spray coater. The term "coating" as used herein is intended to include a dip coating method which comprises immersing one side or both sides of a glass plate in a plastisol and removing excessive sol.

The glass plate coated with the plastisol is then heated to allow the plastisol layer to gel, thereby forming a firm elastic film on the surface of the glass plate. The heating temperature in the step of gelation is usually 130° to 200° C., and the optimal heating temperature and heating time are determined by the composition of the plastisol, degree of polymerization, composition, particle diameter, etc. of the vinyl chloride resin. In the step of gelation, the gelation may be ceased at an appropriate stage by properly selecting the gelation temperature and gelation time so that an uneven portion remains on the surface of the gelation layer, which makes it easy to practice the step of deaeration and contact bonding. Further, the above-mentioned coating by making use of a preheated glass plate brings about the gelation immediately after the coating due to the heat which the glass possesses, which makes it possible to conduct the coating and gelation in one step.

Thereafter, the glass plate having a gel plastisol layer is laminated on another glass plate The resulting laminate is deaerated, if necessary, and heated at 110° to 180° C., thereby obtaining laminated safety glass. For example, the glass plates may be laminated by laminating two glass plates each having a gel plastisol layer formed on one surface thereof so that the gel layers are put together. Alternatively, a glass plate free from a gel layer may be laminated on the gel layer of the glass plate.

The step of deaeration and heating corresponds to a step which is called a step of preliminary contact bonding in the conventional process. Therefore, in this step, the device which has been used in the conventional process can be substantially used. Typical examples of methods for practicing this step include a rubber bag method which comprises placing the laminate in a vacuum bag and deaerating the laminate in vacuo while heating and a roll press method which comprises passing the laminate through a roll and a heating oven.

Various studies on both the above-mentioned methods were made so far, and methods of continuously or automatically conducting this step were proposed and actually practiced. The degree of vacuum and linear pressure of the roll in this step may be the same as the conditions under which the preliminary contact bonding was conducted in the past in the production of laminated safety glass by making use of a plasticized polyvinyl butyral film. However, it is necessary that the heating temperature and time be suitably adjusted according to the state of the gel layer formed on the surface of the glass. Specifically, when the glass plates each having a gel layer which has sufficiently gelled by sufficient heating in the preceding step, i.e., the step of thermal gelation, are put together so that the gel layers face each other, the heating time in this step may be relatively short. On the other hand, the use of a glass plate which was insufficiently treated in the preceding step of thermal gelation requires the heating for a long period of time (10 min to 30 min) at a relatively high temperature (150° C. to 220° C.). When the gelation of the plastisol layer remains insufficient in the final stage, the manufactured laminated safety glass is poor in transparency and, at the same time, is unsatisfactory in adhesion as well as in penetration resistance.

Figure 2:
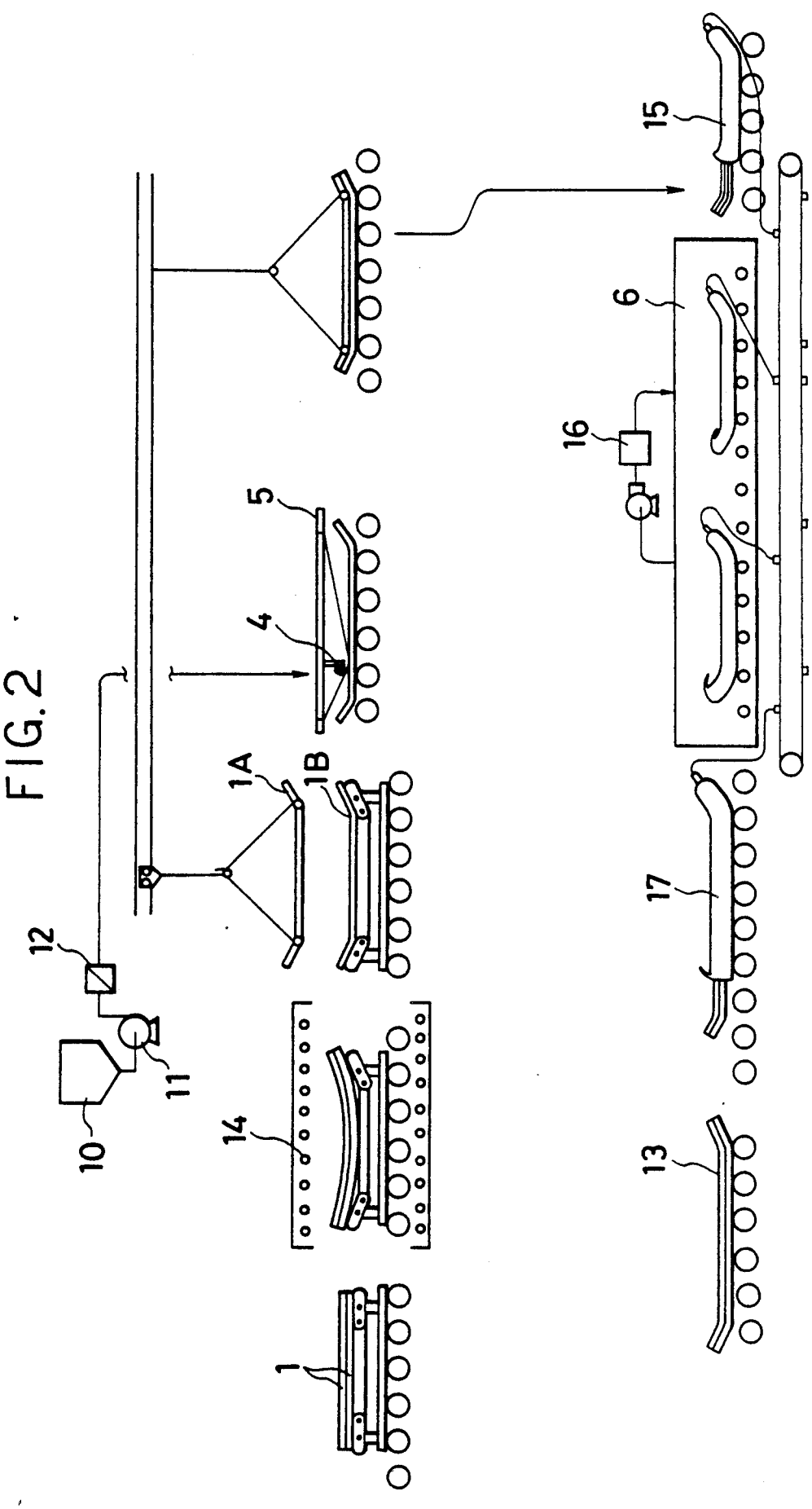
FIG. 2 is a flow diagram showing an example of the process for manufacturing a bent laminated safety glass through the rubber bag method based on the second process according to the present invention.

FIG. 1 shows an example of the process for manufacturing a flat laminated safety glass according to the roll press method. FIG. 2 shows an example of the process for manufacturing a bent, laminated safety glass according to the rubber bag method. In FIG. 1, a glass plate 1 is washed with water by means of a washer 2 and dried in a dryer 3 through the injection of a hot clean air. Then, one side of the glass plate is coated with a plastisol 4 by means of a screen coater 5. It is noted in this connection that the plastisol 4 is fed by means of a pump 11 from a plastisol tank 10 through a strainer 12 into the screen coater 5. The glass plate coated with the plastisol is transferred to a heating oven 6, where it is heated to allow the plastisol to gel. The glass plate having a gel layer thus obtained is laminated on another glass plate having a gel layer so that the gel layers face each other. The resulting laminate is pressed with a pressure roll 7, heated in a heating oven 8 and then pressed again with a pressure roll 9 to obtain laminated safety glass.

In FIG. 2, two glass plates 1,1 are heated in a heating oven 14 to produce bent glass plates. After the bent glass plate 1A is removed, the bent glass plate 1B is coated with a plastisol 4 by means of a screen coater 5. The bent glass plate 1A and the bent glass plate 1B are laminated on each other. The resulting laminate is transferred to a heating oven 6 by means of a rubber bag device 15. In the heating device 6, the laminate is heated by the hot air which is fed from a hot air generator 16 to allow the plastisol to gel, thereby forming a bent laminated safety glass 13. The bent laminated safety glass 13 is taken out of the heating oven 6 with a rubber bag detaching/attaching device 17.

Second Process:

The gap provided between the surfaces of a plurality of glass plates is filled with the above-mentioned plastisol. At least two glass plates filled with the plastisol are then placed in a heating oven, where they are heated at a temperature of usually 150° C. to 220° C. for 10 min to 30 min, thereby obtaining laminated safety glass. The gap between at least two glass plates is filled with the plastisol by a generally accepted casting method.

As is apparent from the foregoing description, the present invention not only realizes the elimination of various steps in the conventional process for manufacturing laminated safety glass which uses a plastic film, such as plasticized polyvinyl butyral, i.e., the complete elimination of procedures accompanying the handling of the plastic film, such as washing, drying, cutting, and moisture regulation and the elimination of the step of contact bonding in an autoclave, but also enables a continuous production through on-line operations of a series of steps, which contributes to an enhancement in the productivity in the production of laminated safety glass.

Further, the present invention, particularly the second process is free from the problem of pot life, because the present invention uses a plastisol composed of a vinyl chloride as an indispensable component.

The present invention will now be described in more detail with reference to the following examples.

In the below Examples and Comparative Example, the units "part" and "%" are each by weight unless otherwise specified.

EXAMPLE 1:

A vacuum high-speed deaerator/mixer was charged with 50 parts of an epoxy group-containing vinyl chloride resin having an average particle diameter of 0.1 $\mu$m and an average degree of polymerization of 1,600 and consisting of 90% of vinyl chloride and 10% of glycidyl methacrylate, 50 parts of a vinyl chloride homopolymer resin having an average particle diameter of 1 $\mu$m, a refractive index of 1,540 and an average degree of polymerization of 1,400, 50 parts of dioctyl phthalate, 10 parts of trischloroethyl phosphate, 4 parts of dibutyltin polymercaptide, 0.3 part of 2-(2'-hydroxy-5'-methylphenyl)benzotriazole, and 0.3 part of 2,2'-methylenebis(4-methyl-6-tert-butylphenol). The contents of the deaerator/mixer were mixed with each other and deaerated therein to obtain a plastisol. Two glass plates each having a size of 305×305 mm and a thickness of 2.5 mm were coated with the plastisol by the silk screen method, followed by heating at 190° C. for 7 min, thereby obtaining two glass plates each having a gel plastisol layer having a thickness of 0.38 mm. The glass plates were put on top of the other so that the surfaces coated with the plastisol faced each other, placed in a rubber bag, and heated at 130° C. under a reduced pressure for 30 min to obtain laminated safety glass free from air bubble.

EXAMPLE 2:

To 100 parts of a vinyl chloride resin having an average particle diameter of 1.2 $\mu$m and an average degree of polymerization of 1,600 and consisting of 80% of vinyl chloride, 3% of allyl glycidyl ether, 5% of glycidyl methacrylate and 12% of vinylidene chloride were added 40 parts of dioctyl adipate, 15 parts of a mineral spirit, 4 parts of dibutyltin polymercaptide, 0.5 part of 2-(2'-hydroxy-5'-methylphenyl)benzotriazole, 0.5% of 2,2'-methylenebis(4-methyl-6-tert-butylphenol), and 5 parts of E-Con 100 (a thixotropic agent manufactured by Nippon Zeon Co., Ltd.). They were mixed with each other and deaerated to obtain a plastisol. Two glass plates each having a size of 305×305 mm and a thickness of 2.5 mm were coated, on one side thereof, with the plastisol by the silk screen method, followed by heating at 120° C. for 5 min, thereby obtaining two glass plates each having a gel layer having a thickness of 0.38 mm. The gel layer was fragile because of insufficient gelation and was opaque and had a rough surface. The glass plates each having the gel layer were put on top of the other so that the gel layers faced each other, and the resulting laminate was plied between rubber rolls and a heating oven kept at 200° C. to obtain a transparent laminated safety glass. The heating time was 2 min/time, and the heating was repeated 5 times. The temperature of the heating oven was 200° C.

EXAMPLE 3:

A plastisol was prepared in the same manner as in EXAMPLE 2, except that 15 parts of trioctyl phosphate was used instead of 15 parts of the mineral spirit and that no E-Con 100 was used. The plastisol was filled through a syringe into the gap between two glass plates which stood upright while leaving a gap of 0.76 mm and sealing the three sides of the peripheral portion from the upper opening, followed by heating in a heating oven at 200° C. for 18 min to allow the plastisol to gel, thereby obtaining laminated safety glass.

COMPARATIVE EXAMPLE 1:

Laminated safety glass was manufactured in the same manner as in EXAMPLE 1, except that the whole of the vinyl chloride resin was the vinyl chloride homopolymer as used in EXAMPLE 1.

EXAMPLE 4:

In order to examine the performance of the laminated safety glass obtained in EXAMPLES 1 to 3 and COMPARATIVE EXAMPLE 1, transparency (visible radiation permeability and haze), penetration resistance, and adhesion of each laminated safety glass were determined by the following methods as described in JIS R3212 "Test Method of Safety Glasses for Road Vehicles". The results are shown in the below Table.

Visible Radiation Permeability:

The visible radiation permeability (%) was determined in the range of 380 mμ to 750 mμ with a spectrophotometer (a product of Hitachi, Ltd.).

Haze:

The haze of the laminated safety glass was determined with a hazemeter (a product of Murakami Color Research Laboratory).

Penetration Resistance:

The laminated safety glass was allowed to stand in an atmosphere of 20° C. Thereafter, a steel ball having a weight of 2.26 kg was dropped from a height of 4 m on the center of the laminated safety glass to observe the penetration of the ball.

Adhesion:

The laminated safety glass was allowed to stand in a room of 23° C.±2° C. for 4 hr. Thereafter, a steel ball having a weight of 227 g was dropped from a height of 9 m on the laminated safety glass. The total weight of the glass which peeled off from the side opposite to the impacted side was then determined.

TABLE

| test item | | EX. 1 | EX. 2 | EX. 3 | EX. 4 |
|---|---|---|---|---|---|
| transparency | visible radiation permeability (%) | 87.6 | 87.9 | 87.7 | 87.9 |
| | haze (%) | 1.8 | 1.7 | 1.7 | 1.7 |
| penetration resistance | | not penetrated | not penetrated | not penetrated | not penetrated |
| adhesion (g) | | 9 | 7 | 9 | 72 |

We claim:

1. A process for manufacturing laminated safety glass, which comprises the steps of:
    (A) coating at least one side of a glass plate with a liquid plastisol comprising 20 to 80 parts by weight of a plasticizer and 100 parts by weight of a particulate resin dispersed in said plasticizer, said resin comprising at least an epoxy group-containing vinyl chloride resin;
    (B) heating the plastisol coated glass plate to gel the plastisol; and
    (C) laminating another glass plate on said plastisol coated glass plate through the gelled plastisol and heating the resulting laminate, thereby bonding the laminated glass plates to each other.

2. A process according to claim 1, wherein said epoxy group-containing vinyl chloride resin is a copolymer of vinyl chloride with an epoxy group-containing monomer.

3. A process according to claim 1, wherein said epoxy group-containing vinyl chloride resin is a resin prepared by dehydrochlorinating a vinyl chloride polymer and then epoxidizing the dehydrochlorination product.

4. A process according to claim 1, wherein the content of the epoxy group in said epoxy group-containing vinyl chloride resin is 0.5% by weight or more.

5. A process according to claim 1, wherein the degree of polymerization of said epoxy group-containing vinyl chloride resin is 600 to 3,000.

6. A process according to claim 1, wherein said plastisol contains a thermal stabilizer and an ultraviolet absorber.

7. A process according to claim 1, wherein said gel plastisol layer is formed at 130° to 200° C.

8. A process according to claim 1, wherein said laminate is heated at 110° to 180° C.

9. A process for manufacturing laminated safety glass, which comprises the steps of:
    (A) filling the spaces between a plurality of glass plates with a liquid plastisol comprising 20 to 80 parts by weight of a plasticizer and 100 parts by weight of a particulate resin dispersed in said plasticizer, said resin comprising at least an epoxy group-containing vinyl chloride resin; and (B) heating the plurality of glass plates containing the liquid plastisol in the spaces therebetween, thereby gelling the plastisol and bonding the plurality of glass plates to one another.

10. A process according to claim 9, wherein said epoxy group-containing vinyl chloride resin is a copolymer of vinyl chloride with an epoxy group-containing monomer.

11. A process according to claim 9, wherein said epoxy group-containing vinyl chloride resin is a resin prepared by dehydrochlorinating a vinyl chloride polymer and then epoxidizing the dehydrochlorination product.

12. A process according to claim 9, wherein the content of the epoxy group in said epoxy group-containing vinyl chloride resin is 0.5% by weight or more.

13. A process according to claim 9, wherein the degree of polymerization of said epoxy group-containing vinyl chloride resin is 600 to 3,000.

14. A process according to claim 9, wherein said plastisol contains a thermal stabilizer and an ultraviolet absorber.

15. A process according to claim 9, wherein said heating temperature is 150° to 220° C.

* * * * *